(12) United States Patent
Peterson

(10) Patent No.: US 9,014,632 B2
(45) Date of Patent: Apr. 21, 2015

(54) OBTAINING VEHICLE TRAFFIC INFORMATION USING MOBILE BLUETOOTH DETECTORS

(75) Inventor: Lawrence M. Peterson, Downers Grove, IL (US)

(73) Assignee: HERE Global B.V., Veldhoven (NL)

( * ) Notice: Subject to any disclaimer, the term of this patent is extended or adjusted under 35 U.S.C. 154(b) by 482 days.

(21) Appl. No.: 13/097,310

(22) Filed: Apr. 29, 2011

(65) Prior Publication Data

US 2012/0276847 A1 Nov. 1, 2012

(51) Int. Cl.
*H04B 7/00* (2006.01)
*G08G 1/01* (2006.01)
*G01S 5/00* (2006.01)

(52) U.S. Cl.
CPC ............ *G08G 1/0116* (2013.01); *G01S 5/0027* (2013.01)

(58) Field of Classification Search
CPC ..................................................... G08G 1/0104
USPC .......................... 455/41.2; 701/117, 118, 119
See application file for complete search history.

(56) References Cited

U.S. PATENT DOCUMENTS

| | | | | |
|---|---|---|---|---|
| 5,428,544 A | * | 6/1995 | Shyu .............................. | 701/117 |
| 5,539,645 A | * | 7/1996 | Mandhyan et al. ............ | 701/119 |
| 5,589,827 A | * | 12/1996 | Scurati .......................... | 340/901 |
| 5,592,172 A | * | 1/1997 | Bailey et al. .................. | 342/350 |
| 5,926,117 A | * | 7/1999 | Gunji et al. ................... | 340/988 |
| 5,983,161 A | * | 11/1999 | Lemelson et al. ............ | 701/301 |
| 6,150,961 A | * | 11/2000 | Alewine et al. ............ | 340/995.1 |
| 6,230,011 B1 | * | 5/2001 | Guenther et al. ........... | 455/432.1 |
| 6,246,932 B1 | * | 6/2001 | Kageyama et al. ............. | 701/24 |
| 6,249,232 B1 | * | 6/2001 | Tamura et al. ................. | 340/902 |
| 6,268,804 B1 | * | 7/2001 | Janky et al. .................... | 340/903 |
| 6,369,720 B1 | * | 4/2002 | Wilhelm ........................ | 340/905 |
| 6,397,141 B1 | * | 5/2002 | Binnig .......................... | 701/117 |
| 6,433,704 B1 | * | 8/2002 | Fushiki et al. ................ | 340/905 |
| 6,505,114 B2 | * | 1/2003 | Luciani ......................... | 701/117 |
| 6,604,045 B2 | * | 8/2003 | Kuroda et al. ................ | 701/423 |
| 6,615,137 B2 | * | 9/2003 | Lutter et al. ................... | 701/301 |
| 6,708,107 B2 | * | 3/2004 | Impson et al. ................ | 701/117 |
| 6,741,932 B1 | * | 5/2004 | Groth et al. ................... | 701/520 |
| 6,785,606 B2 | * | 8/2004 | DeKock et al. ............... | 701/117 |
| 6,791,473 B2 | * | 9/2004 | Kibria et al. ................ | 340/932.2 |
| 6,813,561 B2 | * | 11/2004 | MacNeille et al. ........... | 701/470 |
| 6,816,784 B1 | * | 11/2004 | Khan et al. .................... | 701/409 |
| 6,911,918 B2 | * | 6/2005 | Chen ........................ | 340/995.13 |
| 6,937,934 B2 | * | 8/2005 | Kuroda et al. ................ | 701/533 |
| 6,965,325 B2 | * | 11/2005 | Finnern .................... | 340/995.23 |

(Continued)

OTHER PUBLICATIONS

Wasson, J.S., J.R. Sturdevant, D.M. Bullock, "Real-Time Travel Time Estimates Using MAC Address Matching," Institute of Transportation Engineers Journal, ITE, vol. 78, No. 6, pp. 20-23, Jun. 2008.

(Continued)

*Primary Examiner* — Hai V Nguyen
(74) *Attorney, Agent, or Firm* — Lempia Summerfield Katz LLC

(57) ABSTRACT

A method and system for obtaining traffic information from mobile Bluetooth detectors is disclosed. A mobile Bluetooth detector is a device located in a moving vehicle that includes Bluetooth and GPS firmware for collecting data from Bluetooth enabled devices. The mobile Bluetooth detector transmits the collected data to a remote facility where the data is processed to generate traffic information. A pair of mobile Bluetooth detectors may be used to collect data for generating ground truth.

18 Claims, 4 Drawing Sheets

(56) References Cited

U.S. PATENT DOCUMENTS

| | | | |
|---|---|---|---|
| 6,965,829 B2* | 11/2005 | Yamadaji et al. | 701/301 |
| 6,967,592 B2* | 11/2005 | Bell et al. | 340/905 |
| 6,990,407 B1* | 1/2006 | Mbekeani et al. | 701/117 |
| 6,990,409 B2* | 1/2006 | Khan et al. | 701/445 |
| 7,020,556 B2* | 3/2006 | Kim | 701/454 |
| 7,088,237 B2* | 8/2006 | Arcens | 340/539.13 |
| 7,096,119 B2* | 8/2006 | Kuroda et al. | 701/420 |
| 7,133,767 B2* | 11/2006 | Ogino et al. | 701/400 |
| 7,142,977 B2* | 11/2006 | Knuuttila et al. | 701/117 |
| 7,155,238 B2* | 12/2006 | Katz | 455/456.1 |
| 7,188,025 B2* | 3/2007 | Hudson, Jr. | 701/117 |
| 7,224,983 B2* | 5/2007 | Budka et al. | 455/456.1 |
| 7,375,648 B1* | 5/2008 | Mulka et al. | 340/905 |
| 7,382,274 B1* | 6/2008 | Kermani et al. | 340/901 |
| 7,382,289 B2* | 6/2008 | McCarthy et al. | 340/995.1 |
| 7,444,240 B2* | 10/2008 | Macneille et al. | 701/300 |
| 7,511,634 B2* | 3/2009 | Stehle et al. | 340/905 |
| 7,545,261 B1* | 6/2009 | Harrington | 340/435 |
| 7,558,564 B2* | 7/2009 | Wesby | 455/419 |
| 7,628,704 B1* | 12/2009 | Uhlir et al. | 463/42 |
| 7,634,228 B2* | 12/2009 | White et al. | 455/3.06 |
| 7,657,367 B1* | 2/2010 | Phuyal et al. | 701/117 |
| 7,680,588 B2 | 3/2010 | Tsukamoto | 701/117 |
| 7,693,612 B2* | 4/2010 | Bauchot et al. | 701/1 |
| 7,706,963 B2* | 4/2010 | Parikh et al. | 701/117 |
| 7,711,699 B2* | 5/2010 | Koromyslov et al. | 701/117 |
| 7,741,977 B2* | 6/2010 | Buchalo et al. | 340/933 |
| 7,778,228 B2* | 8/2010 | Dupler et al. | 370/338 |
| 7,847,807 B2* | 12/2010 | Stehle et al. | 345/619 |
| 7,849,139 B2* | 12/2010 | Wolfson et al. | 709/205 |
| 7,856,310 B2* | 12/2010 | Phuyal et al. | 701/117 |
| 7,869,353 B2* | 1/2011 | Bauchot et al. | 370/230 |
| 7,877,196 B2* | 1/2011 | Lin et al. | 701/117 |
| 7,880,644 B2* | 2/2011 | Stommel | 340/936 |
| 7,902,997 B2* | 3/2011 | Stehle et al. | 340/905 |
| 7,912,627 B2* | 3/2011 | Downs et al. | 701/117 |
| 7,949,463 B2* | 5/2011 | Ignatin | 701/117 |
| 7,979,198 B1* | 7/2011 | Kim et al. | 701/117 |
| 7,983,835 B2* | 7/2011 | Lagassey | 701/117 |
| 7,994,902 B2* | 8/2011 | Avery et al. | 340/435 |
| 8,024,482 B2* | 9/2011 | Hoogerwerf et al. | 709/246 |
| 8,041,660 B2* | 10/2011 | Stehle et al. | 706/14 |
| 8,070,608 B2* | 12/2011 | Uhlir et al. | 463/42 |
| 8,072,350 B2* | 12/2011 | Luke | 340/903 |
| 8,189,535 B2* | 5/2012 | Akselsen | 370/331 |
| 8,195,342 B2* | 6/2012 | Anderson | 701/1 |
| 8,233,919 B2* | 7/2012 | Haag et al. | 455/456.3 |
| 8,280,583 B2* | 10/2012 | Stahlin et al. | 701/36 |
| 8,280,617 B2* | 10/2012 | Young et al. | 701/119 |
| 8,289,186 B2* | 10/2012 | Osafune | 340/903 |
| 8,290,480 B2* | 10/2012 | Abramson et al. | 455/418 |
| 8,301,171 B2* | 10/2012 | Dando et al. | 455/456.6 |
| 8,311,858 B2* | 11/2012 | Everett et al. | 705/4 |
| 8,315,646 B2* | 11/2012 | Karjalainen | 455/456.1 |
| 8,321,123 B2* | 11/2012 | Howarter et al. | 701/117 |
| 8,423,255 B2* | 4/2013 | Padmanabhan et al. | 701/70 |
| 8,427,341 B2* | 4/2013 | Yulevich | 340/905 |
| 8,428,856 B2* | 4/2013 | Tischer | 701/117 |
| 8,451,140 B2* | 5/2013 | Piccinini et al. | 340/905 |
| 8,493,234 B2* | 7/2013 | McNamara et al. | 340/905 |
| 8,494,759 B2* | 7/2013 | Hada | 701/117 |
| 8,510,025 B2* | 8/2013 | Chan et al. | 701/117 |
| 8,519,868 B2* | 8/2013 | Nadeem et al. | 340/933 |
| 8,566,011 B2* | 10/2013 | Tas et al. | 701/117 |
| 8,576,069 B2* | 11/2013 | Nadeem et al. | 340/539.25 |
| 8,593,277 B2* | 11/2013 | Nath et al. | 340/539.13 |
| 8,594,915 B2* | 11/2013 | Sakhpara | 701/118 |
| 8,645,492 B2* | 2/2014 | Sultenfuss et al. | 709/217 |
| 8,681,018 B2* | 3/2014 | McNamara et al. | 340/905 |
| 8,717,193 B2* | 5/2014 | Velusamy | 340/905 |
| 8,744,736 B2* | 6/2014 | Basnayake et al. | 701/119 |
| 8,774,145 B2* | 7/2014 | Lin et al. | 370/338 |
| 8,897,948 B2* | 11/2014 | Caveney et al. | 701/29.1 |
| 2002/0030611 A1* | 3/2002 | Nuesser et al. | 340/992 |
| 2002/0085498 A1* | 7/2002 | Nakamichi et al. | 370/236 |
| 2002/0107634 A1* | 8/2002 | Luciani | 701/117 |
| 2002/0128000 A1* | 9/2002 | do Nascimento, Jr. | 455/414 |
| 2002/0142759 A1* | 10/2002 | Newell et al. | 455/414 |
| 2002/0142764 A1* | 10/2002 | Newell et al. | 455/419 |
| 2002/0198632 A1* | 12/2002 | Breed et al. | 701/1 |
| 2003/0069683 A1* | 4/2003 | Lapidot et al. | 701/117 |
| 2004/0073361 A1* | 4/2004 | Tzamaloukas et al. | 701/210 |
| 2004/0128062 A1* | 7/2004 | Ogino et al. | 701/200 |
| 2004/0147223 A1* | 7/2004 | Cho | 455/41.2 |
| 2004/0167710 A1* | 8/2004 | Fushiki et al. | 701/208 |
| 2004/0196161 A1* | 10/2004 | Bell et al. | 340/905 |
| 2004/0230370 A1* | 11/2004 | Tzamaloukas | 701/200 |
| 2005/0088318 A1* | 4/2005 | Liu et al. | 340/902 |
| 2005/0131626 A1* | 6/2005 | Ignatin | 701/117 |
| 2005/0137756 A1* | 6/2005 | Takahashi | 701/1 |
| 2005/0222764 A1* | 10/2005 | Uyeki et al. | 701/210 |
| 2006/0095199 A1* | 5/2006 | Lagassey | 701/117 |
| 2006/0182104 A1* | 8/2006 | Lee et al. | 370/389 |
| 2006/0253226 A1* | 11/2006 | Mendelson | 701/1 |
| 2007/0032225 A1* | 2/2007 | Konicek et al. | 455/417 |
| 2007/0038360 A1* | 2/2007 | Sakhpara | 701/117 |
| 2007/0043500 A1* | 2/2007 | Chen | 701/117 |
| 2007/0112503 A1* | 5/2007 | Johnson et al. | 701/117 |
| 2007/0117525 A1* | 5/2007 | Osafune | 455/99 |
| 2007/0142037 A1* | 6/2007 | O'Toole et al. | 455/414.1 |
| 2007/0213922 A1* | 9/2007 | Van Buer et al. | 701/117 |
| 2007/0257782 A1* | 11/2007 | Etcheson | 340/425.5 |
| 2008/0026771 A1* | 1/2008 | Hill | 455/456.1 |
| 2008/0059050 A1* | 3/2008 | Lin et al. | 701/117 |
| 2008/0086776 A1* | 4/2008 | Tuvell et al. | 726/24 |
| 2008/0089288 A1* | 4/2008 | Anschutz et al. | 370/331 |
| 2009/0112452 A1* | 4/2009 | Buck et al. | 701/117 |
| 2009/0192688 A1* | 7/2009 | Padmanabhan et al. | 701/70 |
| 2009/0210141 A1* | 8/2009 | Young et al. | 701/119 |
| 2009/0271100 A1* | 10/2009 | Kim et al. | 701/118 |
| 2009/0287404 A1* | 11/2009 | DeKock et al. | 701/117 |
| 2009/0287505 A1 | 11/2009 | Liu et al. | 701/119 |
| 2009/0309966 A1* | 12/2009 | Chen et al. | 348/135 |
| 2010/0004849 A1* | 1/2010 | Jeong | 701/200 |
| 2010/0094530 A1* | 4/2010 | Phuyal et al. | 701/117 |
| 2010/0188265 A1* | 7/2010 | Hill et al. | 340/905 |
| 2010/0203834 A1* | 8/2010 | Bragagnini et al. | 455/41.2 |
| 2010/0254282 A1* | 10/2010 | Chan et al. | 370/253 |
| 2010/0324775 A1* | 12/2010 | Kermani et al. | 701/33 |
| 2011/0035098 A1* | 2/2011 | Goto et al. | 701/36 |
| 2011/0095908 A1* | 4/2011 | Nadeem et al. | 340/905 |
| 2011/0112760 A1* | 5/2011 | Serbanescu et al. | 701/204 |
| 2011/0156924 A1* | 6/2011 | Nadeem et al. | 340/905 |
| 2011/0298596 A1* | 12/2011 | Warrick | 340/12.53 |
| 2011/0313654 A1* | 12/2011 | Olson et al. | 701/201 |
| 2012/0112877 A1* | 5/2012 | Gravino et al. | 340/4.31 |
| 2012/0163255 A1* | 6/2012 | Choi | 370/310 |
| 2012/0307676 A1* | 12/2012 | Chan et al. | 370/252 |
| 2013/0006510 A1* | 1/2013 | Young et al. | 701/119 |
| 2013/0049987 A1* | 2/2013 | Velusamy | 340/905 |
| 2013/0101159 A1* | 4/2013 | Chao et al. | 382/103 |

OTHER PUBLICATIONS

University of Maryland—Center for Advanced Transportation Technology, "Bluetooth Traffic Monitoring Technology—Concept of Operation & Deployment Guidelines," pp. 1-5, Sep. 17, 2008.

* cited by examiner macaddr1:

| BLUETOOTH LOG: | date 1 time 1 macaddrA |
| | date 1 time 2 macaddrB |
| GPS LOG: | date 1 time 1 locationW |
| | date 1 time 2 locationX |

402 macaddr2:

| BLUETOOTH LOG: | date 1 time 3 macaddrA |
| | date 1 time 4 macaddrB |
| GPS LOG: | date 1 time 3 locationY |
| | date 1 time 4 locationZ |

```
macaddr1 date 1 time 1 macaddrA locationW
macaddr1 date 1 time 2 macaddrB locationX
macaddr2 date 1 time 3 macaddrA locationY
macaddr2 date 1 time 4 macaddrB locationZ
```

OBTAINING VEHICLE TRAFFIC INFORMATION USING MOBILE BLUETOOTH DETECTORS

FIELD

The present invention relates generally to vehicle traffic, and more particularly, relates to using mobile Bluetooth detectors to obtain vehicle traffic information.

BACKGROUND

Bluetooth is an open wireless technology standard for exchanging data over short distances using short length radio waves from fixed and mobile devices, creating personal area networks (PANs) with high levels of security. A Bluetooth detector is a device that can read and record the unique Media Access Control (MAC) address of other Bluetooth devices that come into radio frequency range of the detector and attempt to establish a Bluetooth connection. When equipped with a Global Positioning System (GPS) device, a Bluetooth detector can also record from where and at what time the unique MAC address was received.

Bluetooth detectors have been placed alongside roads to monitor traffic conditions. Two stationary Bluetooth detectors placed apart from each other alongside a road may observe a vehicle containing a detectable Bluetooth device at two different times. Each detector logs the MAC address of the device in the vehicle and the time of detection. This information may be used to calculate a travel time and speed for a detected vehicle to travel on the road between the two detectors.

While the traffic information obtained from these statically located Bluetooth detectors is useful, the information is limited to just the road located between the detectors. Due to the costs involved with installing and maintaining the Bluetooth detector equipment, it is unlikely that Bluetooth detectors will be deployed alongside roadways in a manner sufficient to cover large portions of a road network. Thus, it would be beneficial to obtain traffic information from Bluetooth detectors in another manner.

SUMMARY

A method and system for obtaining traffic information from mobile Bluetooth detectors is disclosed. A mobile Bluetooth detector is located in a moving vehicle. The detector includes a positioning system (e.g., a GPS system) that detects the location (e.g., latitude and longitude) of the vehicle. The detector also includes a processor that executes machine language instructions stored in data storage to collect data regarding Bluetooth enabled devices attempting to connect with the mobile Bluetooth detector. The detector also includes a communication module that transmits the collected data to a remote facility that generates traffic information.

The method for obtaining traffic information from mobile Bluetooth detectors includes providing a first device in a first vehicle moving in a geographic area. The first device has Bluetooth and GPS capabilities. The method further includes collecting data regarding other devices attempting to connect with the first device. The other devices are located near the first device (i.e., within Bluetooth transmission range). The collected data includes when and where the other devices attempted to connect with the first device. The method also includes transmitting the collected data to a remote facility to generate traffic information.

The remote facility merges the data received from Bluetooth detectors by timestamp and MAC address, and uses map matching to generate traffic information from the merged data. The traffic information may include traffic speeds and travel times of the detected devices. When a pair of mobile Bluetooth detectors is used to collect data from Bluetooth enabled devices traveling on the same road in a direction opposite from the detector pair, the traffic information may be used as ground truth for testing the accuracy of traffic systems.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 4 depicts logs from two Bluetooth detectors, according to an example; and

FIG. 5 depicts processed Bluetooth detector log data from the logs depicted in FIG. 4, according to an example.

DETAILED DESCRIPTION

Figure 1:
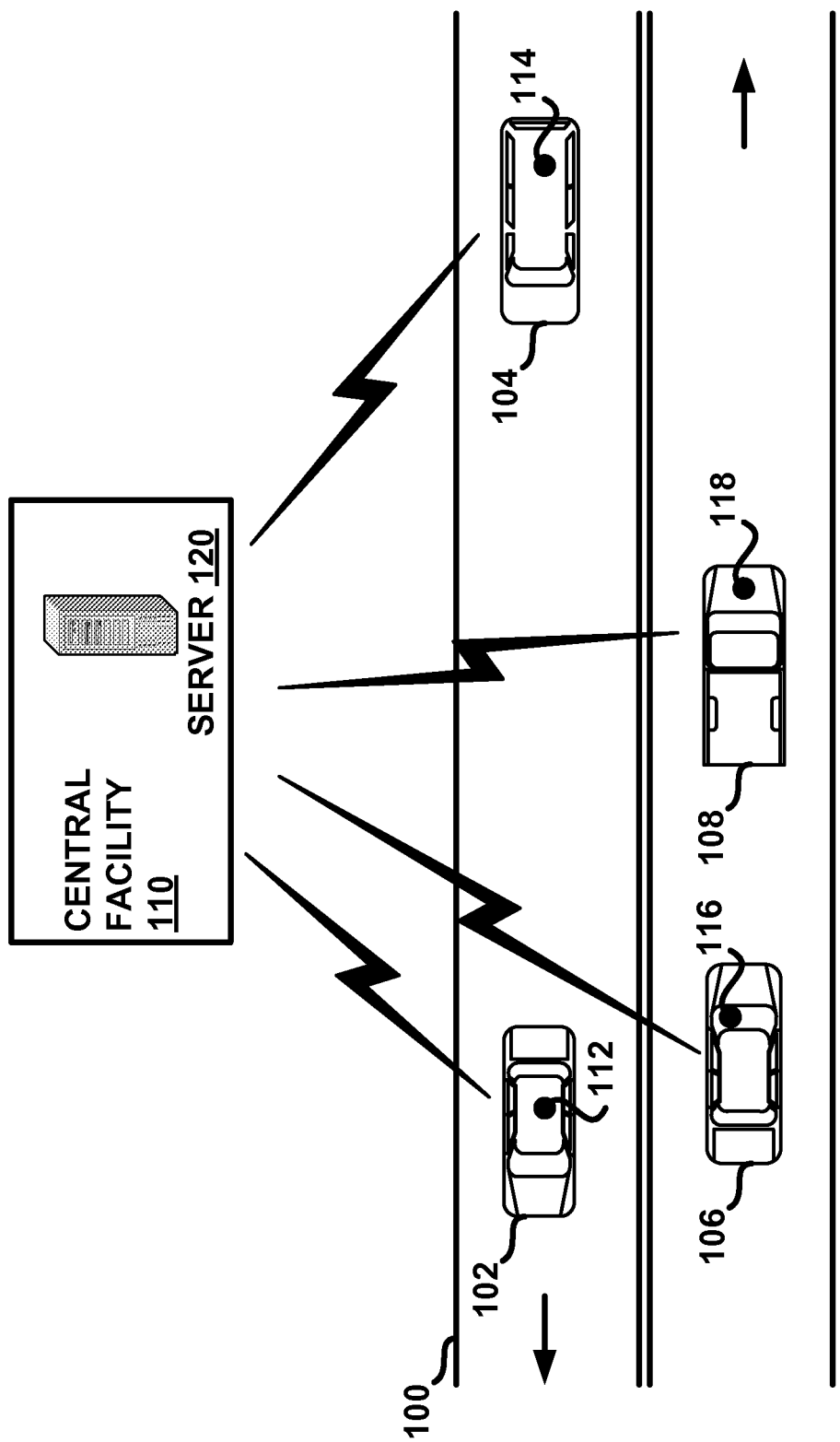
FIG. 1 depicts a portion of a road, according to an example.

FIG. 1 depicts a road 100 that is part of a road network in a geographic area. Four vehicles 102-108 are depicted as traveling on the road 100. Two vehicles 102, 104 are traveling in one direction as denoted by an arrow, and the other two vehicles 106, 108 are traveling in the opposite direction also denoted by an arrow.

Each of the vehicles 102-108 may include a device 112-118 with Bluetooth capability. Bluetooth devices include some mobile telephones, navigation systems, headsets, watches, cameras, PDAs, music players, and so on. The devices 112-118 may also include GPS capability. The devices 112-118 that include both Bluetooth and GPS capability may be used as a mobile Bluetooth detector. For example, many types of mobile telephones may be used as a mobile Bluetooth detector.

While the vehicles 102-108 are shown as cars, trucks, and buses, the vehicles 102-108 may also be motorcycles, bicycles, carts, and any other structures used for transporting people or goods. Vehicles, such as trains and boats, not associated with the road 100 may also be used to transport Bluetooth detectors. Additionally, pedestrians may transport Bluetooth detectors. Thus, the term "vehicle" as used herein is intended to cover any thing or person that can move a Bluetooth detector in a geographic area.

Moreover, it is understood that the vehicles may temporarily stop (e.g., at a stop sign, traffic light, railroad crossing) and still be considered to be a moving vehicle. Thus, the term "mobile" as used herein means that the vehicle is not fixed in a permanent or long term position.

Figure 2:
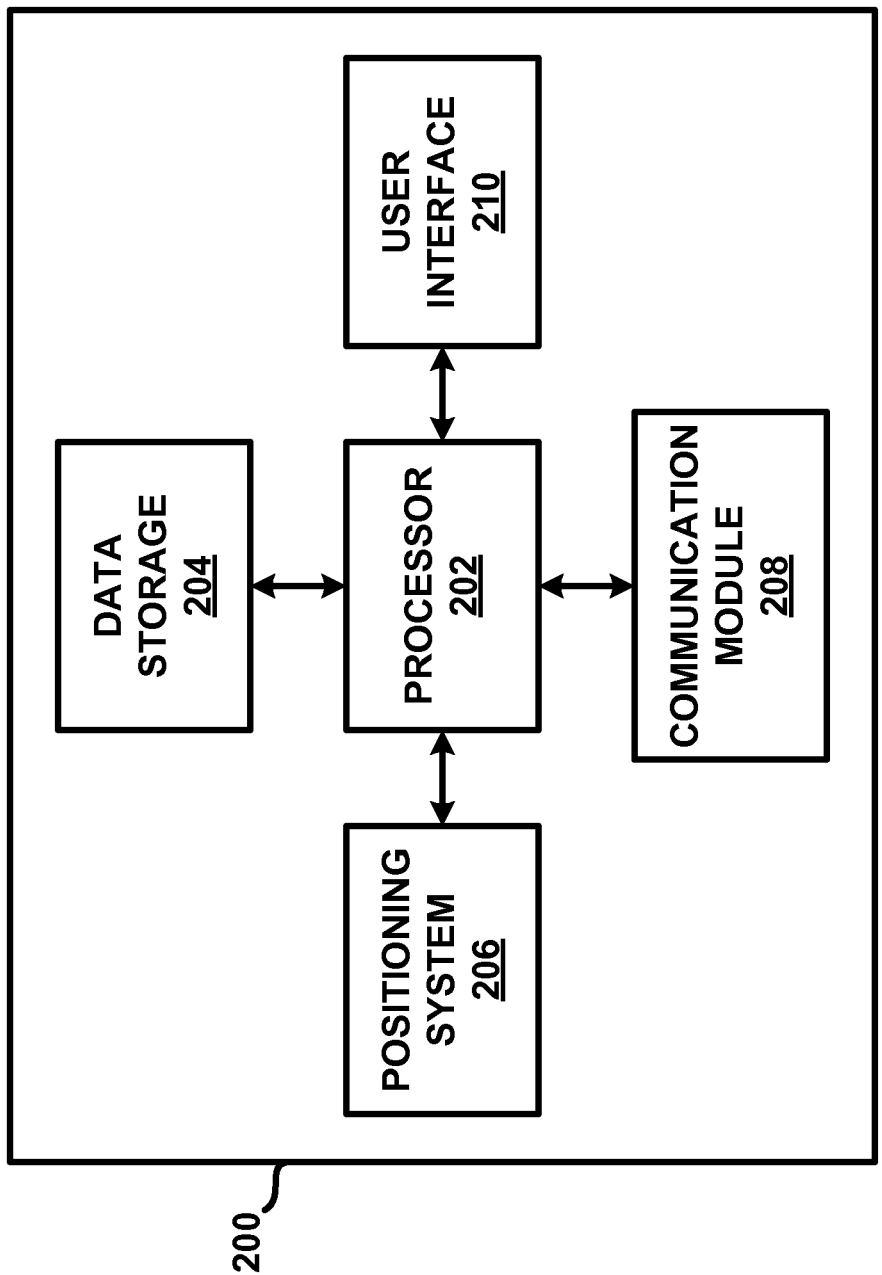
FIG. 2 is a simplified block diagram of a Bluetooth detector, according to an example.

FIG. 2 is a simplified block diagram of a mobile Bluetooth detector 200 that may be included as part of the devices 112-118. The Bluetooth detector 200 may be a combination of hardware, software, and firmware components. The Bluetooth detector 200 includes a processor 202 and a data storage device 204. The processor 202 may be a general purpose processor or a special purpose processor (e.g., digital signal processor). The data storage device 204 may be one or more memory modules that contain software programs, data stores, and other electronic information. For example, the processor 202 may execute computer-readable program instructions contained in the data storage device 204.

The data storage device 204 may also contain firmware (and/or software) providing Bluetooth and GPS capabilities. Bluetooth and GPS capabilities are already built into many cellular phones as part of the cell phone's operating system or application suite. The same is true for many personal navigation devices used by consumers for routing and navigation. The Bluetooth firmware records the MAC addresses and time of reception or detection for each MAC address of all other Bluetooth enabled devices attempting a connection, and saves this information in a log. The GPS firmware records the GPS location and time, and saves this data in a log. Both logs are also stored in the data storage device 204.

The Bluetooth detector 200 also includes a positioning system 206 that determines location. The positioning system 206 may utilize GPS-type technology. The positioning system 206 may also include sensing devices that measure traveling distance, speed, direction, orientation, and so on. The positioning system 206 outputs a signal to the processor 202.

The Bluetooth detector 200 also includes a communication module 208. The communication module 208 is operable to transmit data to and receive data from a remote device. For example the data may be voice, text, or multimedia data. The remote device may be another mobile Bluetooth detector, a computer, or another type of device.

The Bluetooth detector 200 may also include a user interface 210. The user interface 210 may include a keypad having one or more keys (e.g., switches) that are operable to input data into the detector 200. As another example, the user interface 210 may include a microphone and associated electronic circuitry that are operable to input data into the Bluetooth detector 200. The user interface 210 also allows an end user to obtain information from the Bluetooth detector 200.

As the mobile Bluetooth detector 200 moves along the road 100 in one of the vehicles 102-108, the Bluetooth detector 200 may detect other Bluetooth enabled devices. To detect other Bluetooth enabled devices, the devices are within the Bluetooth transmission range of the Bluetooth detector 200. While class 1 Bluetooth devices currently have a transmission range up to 100 meters, it is expected that the range will increase over time. The Bluetooth enabled devices may be moving or stationary.

When the Bluetooth detector 200 detects a Bluetooth enabled device, the Bluetooth detector 200 logs the MAC address of the other device and data associated with when the Bluetooth detector 200 detected the other device. The Bluetooth detector 200 also logs data associated with where the Bluetooth detector 200 detected the other device. The Bluetooth detector 200 may also log other data regarding the detected device, such as device attributes, which provide generic information regarding the detected device. The device attributes may be used in filtering data, identifying vehicles, and/or classifying the detected device.

The communication module 208 transmits the Bluetooth log, the GPS log, and the MAC address of the Bluetooth detector 200 to a central facility 110 for processing. The communication module 208 may also transmit other data, such as the device attributes, to the central facility 110. The MAC address of the Bluetooth detector 200 identifies the unique source of the data. Alternatively, the communication module 208 may transmit a unique identifier other than the MAC address. This unique identifier may be anonymous for security purposes.

The central facility 110 includes a server 120. The server 120 is a computing platform that includes a combination of hardware, software, and/or firmware. For example, the server 120 may include a processor, memory, and a communication system. The communication system receives the GPS and Bluetooth logs, MAC address, and possibly other data from the Bluetooth detector 200 and stores the received data in the memory.

The processor in the server 120 then analyzes the data in the logs to generate traffic information. The traffic information may include traffic speeds and travel times. The traffic information may also include ground truth. Ground truth is used to verify the quality and accuracy of traffic data. Ground truth data is typically collected by trained drivers in test vehicles equipped with accurate GPS devices that collect the average speeds of the vehicles on the road at the same location as the test vehicle. However, test vehicles are expensive, collect limited test data, and are less suitable for testing roadways that have traffic controls due to the number of test vehicles needed to accurately measure average conditions in a variable environment.

Figure 3:
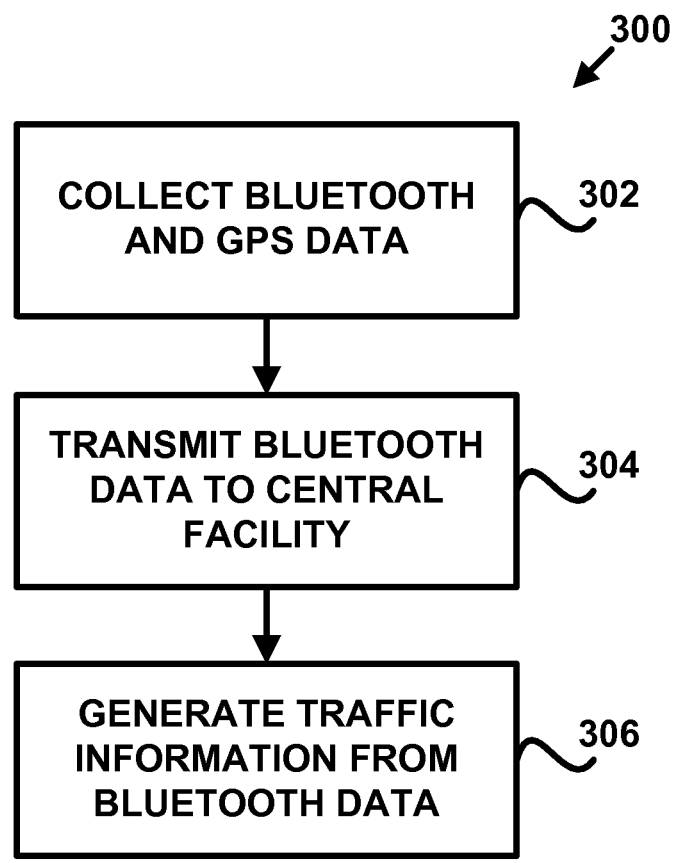
FIG. 3 is a flow chart of a method for obtaining traffic information using mobile Bluetooth detectors, according to an example.

FIG. 3 is a flow chart of a method 300 for obtaining traffic information using mobile Bluetooth detectors. At block 302, mobile Bluetooth detectors collect Bluetooth and GPS data. For example, the devices 112, 114 within the vehicles 102, 104 may be mobile Bluetooth detectors. In this example, the devices 112, 114 may detect the Bluetooth enabled devices 116, 118 as the vehicles 102, 104 pass the vehicles 106, 108 traveling on the opposite side of the road 100.

The mobile Bluetooth detectors 112, 114 log the collected data. The Bluetooth detectors 112, 114 include hardware, software, and/or firmware to record the MAC addresses and time of reception for each of the MAC addresses in a Bluetooth log. In addition, the detectors 112, 114 include hardware, software, and/or firmware to record the GPS location and time in a GPS log.

FIG. 4 depicts example logs 402, 404. While FIG. 4 depicts two logs, it is understood that many detectors may generate many logs. The logs 402, 404 include a Bluetooth log and a GPS log. The log 402 may be a log generated by the Bluetooth detector 112 and the log 404 may be a log generated by the Bluetooth detector 114. In this example, macaddr1 is the MAC address for Bluetooth detector 112 and macaddr2 is the MAC address for Bluetooth detector 114.

The Bluetooth detector 112 detected the MAC address for device A at date 1 and time 1 when the Bluetooth detector 112 was located at location W. The Bluetooth detector 112 detected the MAC address for device B at date 1 and time 2 when the Bluetooth detector 112 was located at location X. The Bluetooth detector 114 detected the MAC address for device A at date 1 and time 3 when the Bluetooth detector 114 was located at location Y. The Bluetooth detector 114 detected the MAC address for device B at date 1 and time 4 when the Bluetooth detector 114 was located at location Z.

Returning to FIG. 3, at block 304, the mobile Bluetooth detectors transmit the collected data to a central facility. For example, the Bluetooth detector 112 may transmit the log 402 along with the detector's MAC address (i.e., macaddr1) to the central facility 110 and the Bluetooth detector 114 may transmit the log 404 along with the detector's MAC address (i.e., macaddr2) to the central facility 110. The mobile Bluetooth detectors 112, 114 may transmit the data at regular time or travel distance intervals. Alternatively, the mobile Bluetooth detectors 112, 114 may transmit the data continuously or based on a schedule, a triggering event, or at any other time.

At block 306, the server 120 at the central facility 110 generates traffic information from the received data. After receiving the data, the server 120 merges the data from the logs 402, 404 by timestamp and MAC address, and stores the merged data into a database. For example, FIG. 5 depicts merged data 500 from the logs 402, 404.

With the merged data 500, the server 120 determines that the Bluetooth enabled device associated with macaddrA traveled from location W to location Y between times 1 and 3 on date 1. Similarly, the server 120 determines that the Bluetooth enabled device associated with macaddrB traveled from location X to location Z between times 2 and 4 on the same day.

The server 120 performs map matching of the merged data 500 to generate traffic speeds and travel times. Map matching compares outputs from a positioning system (e.g., a GPS system) with digital map data in a geographic database to determine the most likely location of the positioning system on the digital map. The server 120 may include a geographic database stored in memory to perform the map matching. Alternatively, the server 120 may use the communication system to access a geographic database located remote from the server 120. The geographic database may be a geographic database published by NAVTEQ North America, LLC of Chicago, Ill.

The server 120 may filter the merged data 500 prior to analyzing the data to generate traffic information. For example, not all Bluetooth enabled devices are located in a vehicle traveling on a road network. During map matching, the server 120 may determine whether the Bluetooth detector 200 is in a vehicle moving on the road network. Bluetooth signals from pedestrians, households, and other non-vehicular Bluetooth devices may be removed from the merged data 500. Bluetooth signals from vehicles not traveling on a roadway, such as trains and boats, may also be removed from the merged data 500. The additional device attributes logged at the time of detection may assist in classifying the detected devices as being located in a vehicle.

To remove Bluetooth signals from the merged data 500, the server 120 may compare detections from macaddrA and macaddrB with reference to the locations and times for macaddr1 and macaddr2 to determine if macaddrA and macaddrB "act" like vehicles moving along a roadway. In other words, the server 120 processes the data collected by macaddr1 and macaddr2 into logical vehicle speeds along a roadway path.

In order to do this, the server 120 determines the speed and direction of macaddrA and macaddrB over time. The server 120 determines if the speeds are logical vehicle speeds and direction of travel indicate a general roadway path. If the locations for macaddr1 and macaddr2 are on a roadway traveling in the same direction, the data for macaddrA and macaddrB may show travel times and speeds in the opposite direction from macaddr1 and macaddr2.

If macaddrA and macaddrB are stopped or moving slowly, the server 120 looks for higher speeds at a previous time along the roadway. If recent faster speeds along the roadway are known, then the slower speeds can be retained. If no high speed data is seen from macaddrA or macaddrB, then the data from these devices may be removed from the merged data 500 because this data may not be vehicular data.

To distinguish stopped vehicles from pedestrians, the server 120 may develop a profile of speeds and map matched roadway locations for each MAC address detected by a series of Bluetooth detectors. The profiles of detected Bluetooth devices create a picture of what is happening on the roadway. For example, if one detected Bluetooth device is stopped (e.g., a pedestrian or a disabled vehicle) and the other detected devices around the stopped device indicate movement on the roadway, then the data from stopped device may be removed from the merged data 500.

As previously mentioned, the mobile Bluetooth detector 200 may also be used to create a ground truth for testing roadways. For ground truth, a pair of Bluetooth detectors 200 separated by a variable distance and traveling in the same direction on the same roadway is used to determine the speeds or travel times of vehicles containing Bluetooth enabled devices traveling in the opposite direction on the same roadway. Preferably, the distance between the Bluetooth detectors is between one and five miles; however, other distances may be used. The mobile Bluetooth collection pairs (e.g., detectors 112, 114) can log and measure many ground truth samples from the Bluetooth enabled devices in vehicles traveling in the opposite direction on the same roadway (e.g., devices 116, 118).

The remote facility 110 may provide the traffic information to businesses providing a traffic service (i.e., B2B) and/or consumers using various traffic enabled devices, such as a navigation system (i.e., B2C). For example, a traffic data supplier may provide the traffic information in the form of one or more data feeds, such as an RSS or XML feed.

Mobile Bluetooth detectors overcome the problems with static Bluetooth detectors and test vehicles. The mobile Bluetooth detectors provide large volumes of floating car data (FCD), which allows traffic data suppliers to generate traffic information with reduced cost and expanded coverage. Moreover, the traffic data suppliers may use pairs of mobile Bluetooth detectors to accurately test vehicle speeds on all types of roads at a reduced cost.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A mobile Bluetooth detector located in a moving vehicle, comprising in combination:
   a positioning system that detects a location of the vehicle;
   data storage storing machine language instructions for collecting data regarding Bluetooth enabled devices attempting to connect with the mobile Bluetooth detector, wherein the collected data includes:
   a Bluetooth log including a first time associated with a first address of a first Bluetooth enabled device and a second time associated with a second address of a second Bluetooth enabled device, and
   a location log including a first location of the vehicle associated with the first time when a connection attempt of the first Bluetooth enabled device is logged and a second location of the vehicle associated with the second time when a connection attempt of the second Bluetooth enabled device is logged;
   a processor that executes the machine language instructions stored in the data storage; and
   a communication module for transmitting the data collected from the Bluetooth enabled devices to a remote facility that generates traffic information.

2. The detector of claim 1, wherein the first address and the second address are MAC addresses of the Bluetooth enabled devices.

3. The detector of claim 1, wherein the communication module also transmits a MAC address of the mobile Bluetooth detector to the remote facility.

4. The detector of claim 1, wherein the communication module also transmits an anonymous identifier of the mobile Bluetooth detector to the remote facility.

5. A method of obtaining traffic information from a mobile Bluetooth detector, comprising:
- providing a first device in a first vehicle moving in a geographic area and a second device in a second vehicle moving in the geographic area, wherein the first device and the second device have Bluetooth and GPS capabilities;
- collecting a first log of connection attempts of at least a third device attempting to connect with the first device, wherein the first log includes a first time and first location when and where the third device attempted to connected with the first device;
- collecting a second log of connection attempts of at least the third device attempting to connect with the second device, wherein the second log includes a second time and second location when and where the third device attempted to connect with the second device;
- transmitting the first log of connection attempts from the first device to a remote facility that generates traffic information; and
- transmitting the second log of connection attempts from the second device to a remote facility that generates traffic information.

6. The method of claim 5, wherein the first device is a mobile telephone.

7. The method of claim 5, wherein the first log includes a MAC address of the first and third devices.

8. The method of claim 5, further comprising transmitting a MAC address of the first device to the remote facility.

9. The method of claim 5, further comprising transmitting an anonymous identifier of the first device to the remote facility.

10. The method of claim 5, wherein the log is transmitted to the remote facility at periodic intervals.

11. A method of generating traffic information from data collected by mobile Bluetooth detectors, comprising:
- from a first set of devices, receiving data regarding when and where a second set of devices have made connection attempts with the first set of devices, wherein the first set of devices are mobile Bluetooth detectors and the second set of devices are Bluetooth enabled devices;
- storing the received data including connection attempts and in a log, wherein the second set of devices is traveling in a direction opposite from a direction of the first set of devices on a road,
- merging the received data by timestamp and MAC address; and
- map matching the merged data to generate traffic information.

12. The method of claim 11, further comprising filtering the merged data prior to generating the traffic information.

13. The method of claim 12, wherein the traffic information is traffic speeds or travel times.

14. The method of claim 12, wherein the first set of devices is a pair of mobile Bluetooth detectors separated by a distance and traveling in a same direction on a road.

15. The method of claim 11, wherein the traffic information is ground truth.

16. The method of claim 11, further comprising:
- filtering the merged data to remove data collected by trains, boats, or pedestrians.

17. The method of claim 11, wherein the traffic information includes speeds of the second set of devices.

18. The method of claim 17, further comprising:
- developing a speed profile based on a subset of the speeds of the second set of devices;
- performing a comparison a subsequent speed to the speed profile; and
- discarding the subsequent speed based on the comparison.

* * * * *